(12) United States Patent
Nagelsmit et al.

(10) Patent No.: US 8,541,090 B2
(45) Date of Patent: Sep. 24, 2013

(54) METHOD FOR MAKING A COMPOSITE MATERIAL, COMPOSITE MATERIAL AND END PRODUCT

(75) Inventors: Martin Herman Nagelsmit, Blokzijl (NL); Christos Kassapoglou, Den Hoorn (NL); Hubertus Gerardus Stephanus Jozef Thuis, Kraggenburg (NL); Zafer Gürdal, Delft (NL); Willem Antonius Roy Wildvank, Dalfsen (NL)

(73) Assignee: Stichting National Lucht-En Ruimtevaart Laboratorium, Amsterdam (NL)

( * ) Notice: Subject to any disclaimer, the term of this patent is extended or adjusted under 35 U.S.C. 154(b) by 0 days.

(21) Appl. No.: 13/522,976

(22) PCT Filed: Jan. 28, 2011

(86) PCT No.: PCT/EP2011/051183
§ 371 (c)(1),
(2), (4) Date: Aug. 14, 2012

(87) PCT Pub. No.: WO2011/092271
PCT Pub. Date: Aug. 4, 2011

(65) Prior Publication Data
US 2012/0321838 A1 Dec. 20, 2012

(51) Int. Cl.
*B32B 3/02* (2006.01)
*B32B 3/10* (2006.01)
*B32B 5/12* (2006.01)
*B32B 37/00* (2006.01)
*B29C 65/00* (2006.01)

(52) U.S. Cl.
USPC ........ 428/109; 428/34.5; 428/36.3; 428/36.1; 428/222; 428/377; 428/378; 428/114; 156/166; 156/425; 156/187; 156/443; 156/161; 138/129; 138/137; 138/144; 242/174; 87/1; 87/3; 87/5; 87/8; 87/13

(58) Field of Classification Search
None
See application file for complete search history.

(56) References Cited

U.S. PATENT DOCUMENTS

| | | | | |
|---|---|---|---|---|
| 1,011,090 A | * | 12/1911 | Subers | 138/130 |
| 1,024,915 A | * | 4/1912 | Subers | 428/110 |
| 2,843,153 A | * | 7/1958 | Young | 285/112 |

(Continued)

OTHER PUBLICATIONS

European Search Report, mailed Jul. 19, 2010 in connection with European Patent Application 10151976.7.

(Continued)

*Primary Examiner* — David Sample
*Assistant Examiner* — Nicole T Gugliotta
(74) *Attorney, Agent, or Firm* — Westman, Champlin & Kelly, P.A.

(57) ABSTRACT

A method is presented for making a composite material from strips comprising longitudinal fibers and a binder or resin, which material comprises a number of layer assemblies one on top of the other. Each layer assembly comprises m sets (with m at least 2) of parallel strips each extending in a different direction, Each layer assembly is manufactured by successive steps of depositing groups of parallel strips according to a well defined pattern (without longitudinally interweaving strips with previously deposited strips). Before completing a layer assembly, with the exception of the last layer assembly, by depositing its last group of parallel strips, the first group of parallel strips of the following layer assembly is already deposited. A composite material manufactured with such a method is presented too.

20 Claims, 7 Drawing Sheets

(56) References Cited

U.S. PATENT DOCUMENTS

| | | | | |
|---|---|---|---|---|
| 3,616,000 | A | * | 10/1971 | Butzow et al. ............... 156/173 |
| 3,692,375 | A | * | 9/1972 | Matt et al. .................... 384/298 |
| 3,713,932 | A | * | 1/1973 | Butzow et al. ............... 156/173 |
| 4,258,960 | A | * | 3/1981 | Harris .......................... 384/297 |
| 4,283,446 | A | * | 8/1981 | McLain ....................... 428/36.3 |
| 4,568,582 | A | * | 2/1986 | Kikuzawa et al. ........... 428/34.5 |
| 6,482,497 | B1 | * | 11/2002 | Kay et al. .................... 428/111 |
| 2004/0074592 | A1 | | 4/2004 | Ashton |
| 2006/0222837 | A1 | | 10/2006 | Kismarton |

OTHER PUBLICATIONS

International Search Report, mailed Apr. 20, 2011 in connection with International Patent Application PCT/EP2011/051183.

* cited by examiner

METHOD FOR MAKING A COMPOSITE MATERIAL, COMPOSITE MATERIAL AND END PRODUCT

PRIORITY CLAIM TO RELATED APPLICATIONS

This application is a national stage application under 35 U.S.C. § 371 of PCT/EP2011/051183, filed Jan. 28, 2011, published as WO 2011/092271 A1 on Aug. 4, 2011, and claiming priority to European Application No. 10151976.7, filed Jan. 28, 2010, which application and publication is incorporated herein by reference and made a part hereof in its entirety, and the benefit of priority of which is claimed herein.

The invention firstly relates to a method for making a composite material from strips comprising longitudinal fibres and a binder or resin.

Such a method is known as automated fibre/tow placement. It generally uses materials that typically are composed of tapes, or strips, commonly known as "tows" or "slit tapes" comprising longitudinal fibres and a binder (or resin). Individual strips or tows are manipulated to form a band of material that is deposited onto a tool, Parts are built up layer-by-layer with strips or tows of composite material, with the angle at which each layer ("ply") is deposited onto the tool being precisely determined by the fibre placement process.

Automated fibre/tow placement enables the construction of complex composite structures using steered or curvilinear fibre paths. This method of producing composite structures is more cost effective than manual methods. It provides an improved structural efficiency due to its ability to orient the fibres along local internal load paths, which potentially results in lighter structures that are also lower in cost than structures made by other production methods.

Composites fabricated with such automated fibre/tow placement are built-up in layers and are sensitive to damage. Even low speed impact can cause damage below the surface of the composite material that is not visible by the naked eye. Such damage, in the form of matrix cracks, de-laminations (separation between layers or plies), and (usually limited) broken fibers, reduces the strength of the composite structure drastically, especially under compression and shear loads, and may lead to a catastrophic failure of a structure, The main reason for this sensitivity of the composite material to impact is the low out-of-plane strength of the matrix between plies where only resin (and no fibres) is present of which the strength is very low. The matrix between plies is, typically, at least an order of magnitude weaker than the fiber matrix combination in each ply. During impact, out-of-plane loads (perpendicular to the plane of the laminate) are generated which exceed the strength of the matrix between plies. As a result, the matrix cracks. These cracks coalesce into delaminations and may also break fibers. Accounting for this strength reduction in the presence of damage requires adding more material and thus increasing the weight of the structure.

Although it is possible to compensate for the strength reduction of such composite materials by making them, thicker or by providing some sort of through-the-thickness reinforcement (usually achieved by stitching, weaving, braiding etc.), such measures increase the weight and the cost of such material. Further a through-the-thickness reinforcement tends to reduce the in-plane strength (the reinforcing fibers act as stress concentrations) and thus still more material is needed for achieving the required strength, further adding to the weight and cost.

With respect to the above there is a need for an alternative method for making a composite material that would be more tolerant to damages with no or hardly any increase in weight, and cost for the fabrication, of said composite material.

Thus, in accordance with the present invention the method is intended for making a composite material from strips comprising longitudinal fibres and a binder or resin, which material comprises a number of layer assemblies one on top of the other, wherein each layer assembly comprises m sets (with m at least 2) of parallel strips each extending in a different direction and wherein each layer assembly is manufactured by the successive steps of a. depositing, as part of a first set of strips, a first group of parallel strips side by side at a predetermined spacing;

b. depositing, as part of a second set of strips, on top of the first group of strips, a second group of parallel strips side by side at said predetermined spacing and each extending at an angle, different from 180° with respect to the strips of the first group;

c. repeating step b. for all remaining sets of the m sets of strips, wherein the strips deposited, as part of each next set of parallel strips are deposited at an angle different from 180° with respect to the strips of all the previous sets;

d. positioning, as a further part of the first set of strips, on top of the previously deposited groups of strips, a next group of parallel strips side by side at said predetermined spacing, in parallel to and immediately adjacent to the strips of the first group;

e. positioning, as a further part of the second set of strips, on top of the previously deposited groups of strips, a next group of parallel strips side by side at said predetermined spacing, in parallel to and immediately adjacent to the strips of the second group;

f. repeating step e. for all remaining sets of the m sets of strips;

g. repeating the steps d. until f. until a last group of parallel strips is deposited as part of the last set of strips such that all the predetermined spacings are completely occupied by adjacently positioned strips and a layer assembly is completed, and wherein, before completing a layer assembly, with the exception of the last layer assembly, by depositing its last group of parallel strips during the respective step g, the first group of parallel strips of the following layer assembly is deposited in accordance with the respective step a.

Because of the specific manner in which a layer assembly is manufactured it everywhere comprises a number of m strips (equal to the number of sets) one on top of the other, wherein said strips are positioned according to a regular pattern exclusively by a process of successive deposition without a process of interweaving a strip in its longitudinal direction with strips already positioned. As a result in the completed layer assembly a strip at different positions along its length will define a different one of the m layers (sets of parallel strips) of the layer assembly (defining, if for example m=3, at some positions the lower layer, at some positions the middle layer and at some positions the upper layer).

The inventive method thus firstly creates an interlocking pattern within each layer assembly which improves the damage resistance and damage tolerance of such a layer assembly and a composite material comprising such layer assemblies significantly without increasing the structural weight. The pattern(s) created with the strips for manufacturing a layer assembly, which can be optimized for different loading situations and desired stacking sequences, provides a through-the-thickness reinforcement and contains the damage created during impact by not allowing delaminations to grow to the sizes that conventional layer assemblies would exhibit under the same impact level. In a sense, they reinforce the layer between plies by allowing fibers to cross over from one ply to the next so the material does not rely solely on the matrix strength to carry the out-of-plane loads created during impact. The impact energy is redistributed among indentation, matrix crack creation, delamination formation and fiber breakage by reducing the areas of delaminations created and increasing the indentation depth and density of matrix cracks created. The reduced delamination sizes translate, in turn, to increased loads at which these layer assemblies (and composite materials comprising these) would buckle and cause failure of the entire structure. Thus, the damage tolerance of the layer assemblies (and thus composite material) increases and less material is needed to meet the same requirements. As a result, composite materials and structures of significantly lower weight can be created.

The number m of sets of strips in a layer assembly will be limited for practical reasons. If m becomes too large, a strip has to 'cross over' too far from the lowermost layer (or set) to the uppermost layer (or set) and will have parts extending with an unfavourable large inclination relative to the general extension of the layer assembly. Thus, for obtaining a composite material with increased thickness (total number of layers or sets increasing the allowable number m) a number of layer assemblies will have to be positioned one on top of the other. However, to prevent a delamination between such stacked layer assemblies, in a further aspect of the method according to the present invention an interlocking between the successive layer assemblies will be created by the fact that the first group of parallel strips (forming part of the first set of parallel strips) of a successive layer assembly is already deposited before the last group of parallel strips (forming part of the last set of parallel strips) of the preceding layer assembly is deposited.

In a preferred embodiment of the method according to the present invention the strips of the first group of parallel strips of the following layer assembly are deposited at an angle with respect to the strips of the last group of parallel strips of the previous layer assembly. This yields an improved coherence between these groups (and the sets of strips which they belong to) and an improved quality of the final composite material.

Depending on the chosen spacing differently configured materials are obtained. When, for example, the strips of each group are deposited at a spacing substantially equal to an integer multiple n of the strip width, step g. comprises repeating the steps d. until f. n−1 times. The value of n then determines the final composition of the composite material (disposition of and relation between strips).

In one specific embodiment the strips of each group are deposited at a spacing substantially equal to the strip width and step g is omitted.

Further it is possible that at least one layer assembly comprises only two sets (m=2) of parallel strips, for example extending orthogonally to each other. Additionally or as an alternative it is possible that at least one layer assembly comprises four sets (m=4) of parallel strips, for example extending at 45°, 90° and −45° with respect to each other.

Further it is possible that all the layer assemblies basically comprise the same number and arrangement of sets of strips. Because of the interlock pattern between a first group of strips (of a first set) of a successive assembly and last group of strips (of a last set) of a previous assembly the assemblies always will differ slightly.

In a second aspect of the present invention a composite material made from strips comprising longitudinal fibres and a binder or resin is provided, which material comprises a number of layer assemblies one on top of the other, wherein each layer assembly comprises m sets (with m at least 2) of parallel strips each extending in a different direction, with a. a first group of parallel strips deposited side by side at a predetermined spacing;
b. on top of the first group of strips, a second group of parallel strips deposited side by side at said predetermined spacing and each extending at an angle different from 180° with respect to the strips of the first group;
c. a repetition of groups according to b. for ail remaining sets of the m sets of strips, wherein the strips deposited as part of each next set of parallel strips are deposited at an angle different from 180° with respect to the strips of all the previous sets;
d. on top of the previously deposited groups of strips, a next group of parallel strips deposited side by side at said predetermined spacing, in parallel to and immediately adjacent to the strips of the first group;
e. on top of the previously deposited groups of strips, a next group of parallel strips deposited side by side at said predetermined spacing, in parallel to and immediately adjacent to the strips of the second group;
f. a repetition of groups according to e. for all remaining sets of the m sets of strips;
g. a repetition of groups according to d. until f. until a last group of parallel strips is deposited such that all the predetermined spacings are completely occupied by adjacently positioned strips, and wherein the first group of parallel strips according to a. of a following layer assembly is deposited below the last group of parallel strips according to g of a previous layer assembly.

Preferred embodiments of such a composite material follow from the respective sub claims.

In a fourth aspect of the present invention an end product is provided, comprising the composite material according to the present invention.

Hereinafter the invention will be elucidated while referring to the drawings, in which.

A composite material according to the present invention comprises a number of layer assemblies one on top of the other. Each layer assembly comprises a number (m) of sets of parallel strips one on top of each other.

It is noted that "one on top of each other" should not be taken too literally because adjacent layer assemblies are interwoven and because the strips of adjacent sets are interwoven, as will appear below.

Each set will be manufactured by a specific method of depositing groups of parallel strips.

Figure 1:
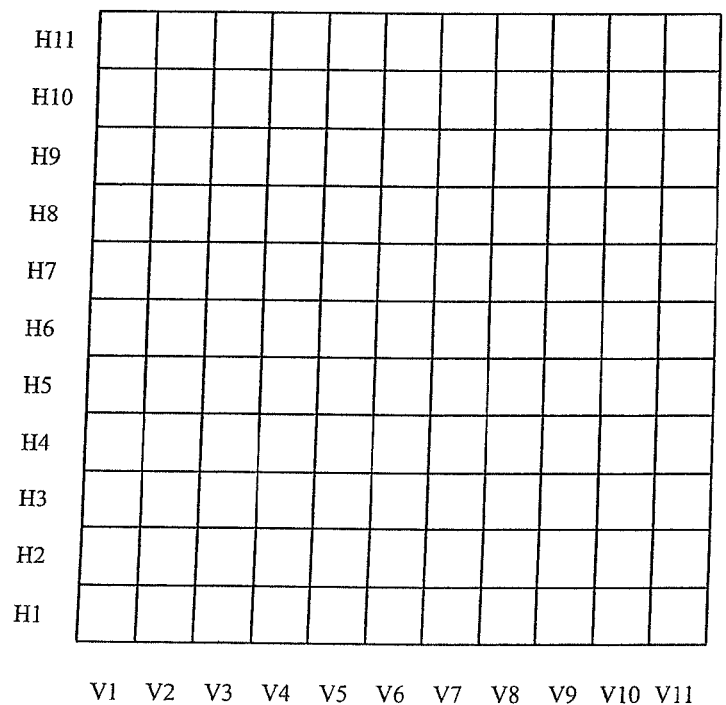
FIG. 1 is a sketch for use when illustrating the basic manufacture of a layer assembly according to the invention.

FIG. 1 shows a sketch with a pattern of horizontal arrays H1-H11 and vertical arrays V1-V11. The angle between the horizontal and vertical arrays is 90°. This FIG. 1 together with FIG. 2 will be used to explain hew a layer assembly may be manufactured with two (m=2) sets of strips.

Figure 2A:
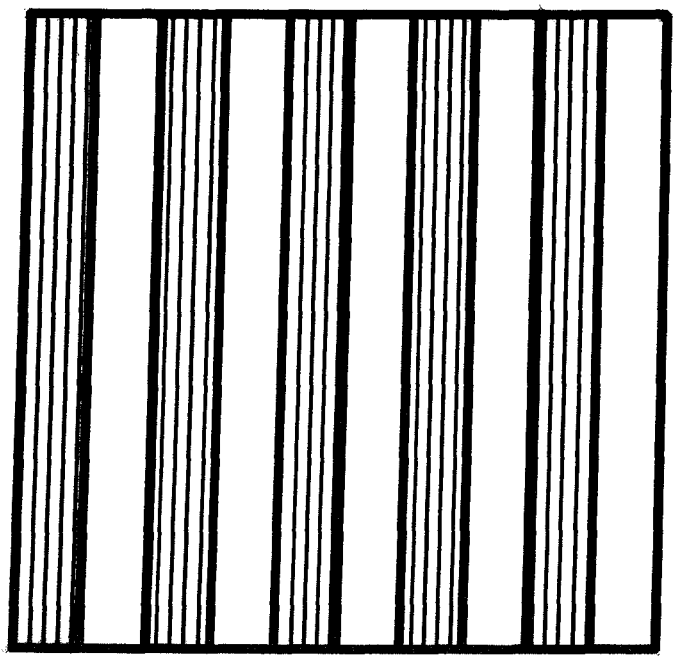
FIG. 2 shows four successive stages during making an embodiment of a layer assembly.

For the basic manufacture of a layer assembly firstly a first group of parallel strips (which will be part of a first set of strips) is positioned side by side at a predetermined spacing (said spacing in this embodiment being equal to the width of an array) according to vertical arrays V1, V3, V5, V7, V9 and V11. The result is illustrated in FIG. 2a.

Figure 2B:
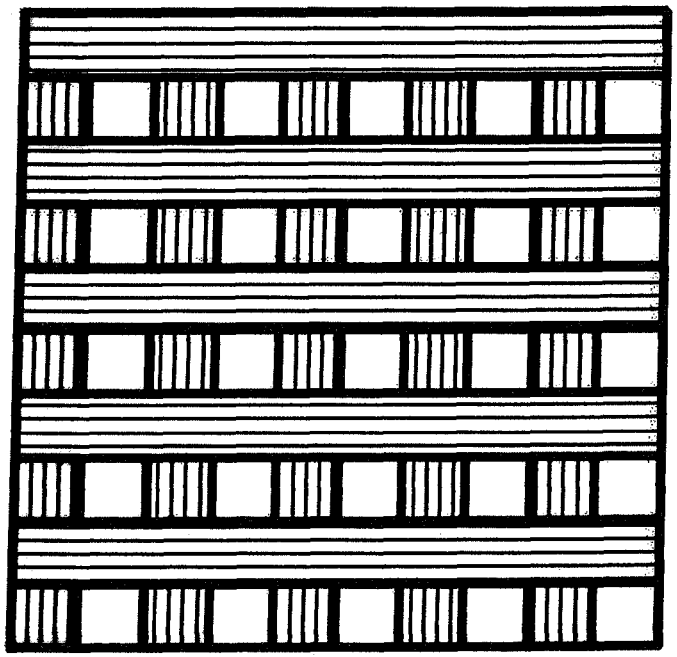

Next, on top of the first group of strips, a second group of parallel strips (which will be part of a second set of strips) is deposited side by side at said predetermined spacing and each extending at the angle of 90° with respect to the strips of the first group according to the horizontal arrays H1, H3, H5, H7, H9 and H11. The resulting pattern is illustrated in FIG. 2b.

Figure 2C:
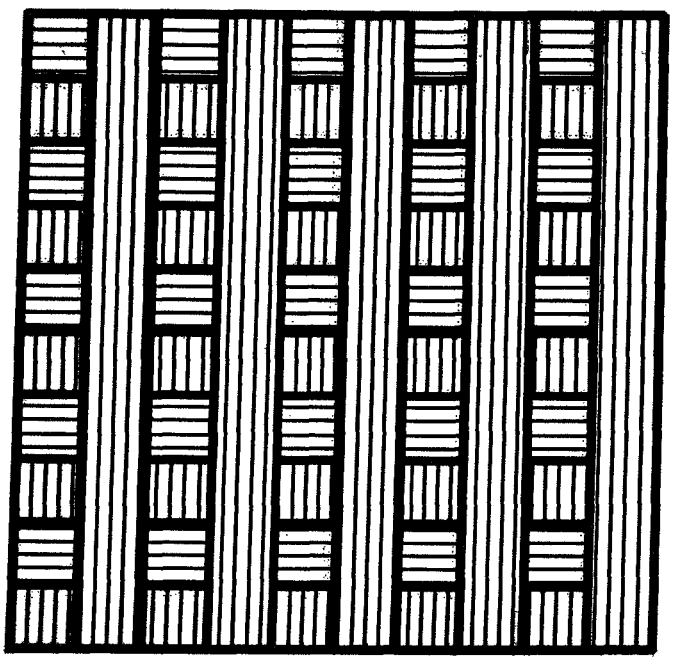

Now, on top of the previously deposited groups of strips, a third group of parallel strips is deposited (as further part of the first set of strips) side by side at said predetermined spacing, in parallel to and immediately adjacent to the strips of the first group at vertical arrays V2, V4, V6, V8 and V10. This yields the pattern as shown in FIG. 2c.

Figure 2D:
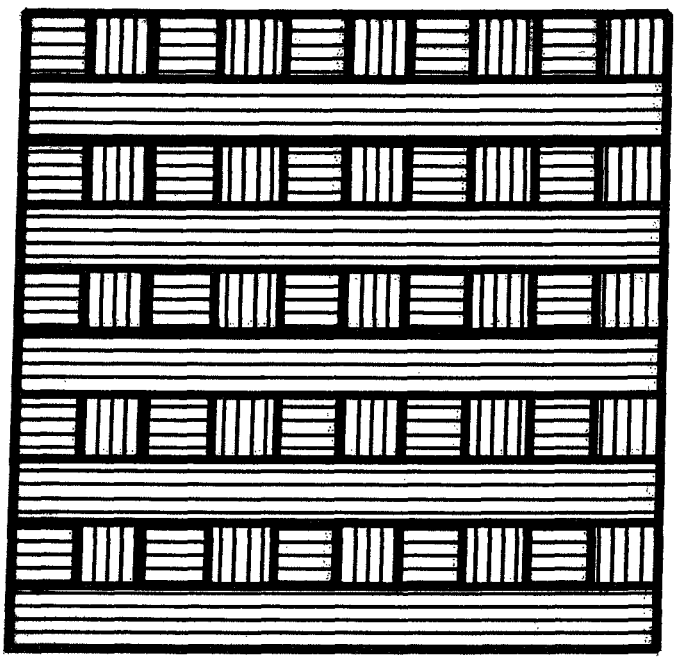

Finally, on top of the previously deposited groups of strips, a fourth group of parallel strips (as further part, of the second set of strips) is deposited side by side at said predetermined spacing, in parallel to and immediately adjacent to the strips of the second group according to horizontal arrays H2, H4, H6, H8 and H10. This completes the basic layer assembly as shown in FIG. 2d.

In this embodiment the strips of each group are deposited at a spacing substantially equal to the strip width. However, it is possible too to make a layer assembly in which the strips of each group are deposited at a spacing substantially equal to an integer multiple n of the strip width. In such a case the last two steps of depositing the third and fourth groups of strips should be repeated n−1 times until the predetermined spacings are completely occupied by adjacently positioned strips.

When, for example n=2 (spacing between adjacent strips of the first or second groups being twice the width of a strip) the deposition of the third and fourth groups should be repeated once (n−1=1), Further, this embodiment relates to a layer assembly with two (m=2) sets of strips. It is possible too, however, that there are more sets, for example four (m=4) sets of which the strips extend in different directions (e.g. at 0°, 45°, 90° and −45°). The method then will be amended accordingly by a repetition of the steps leading to the results according to FIGS. 2a and 2b before starting the steps leading to the results according to FIGS. 2c and 2d.

Figure 3:
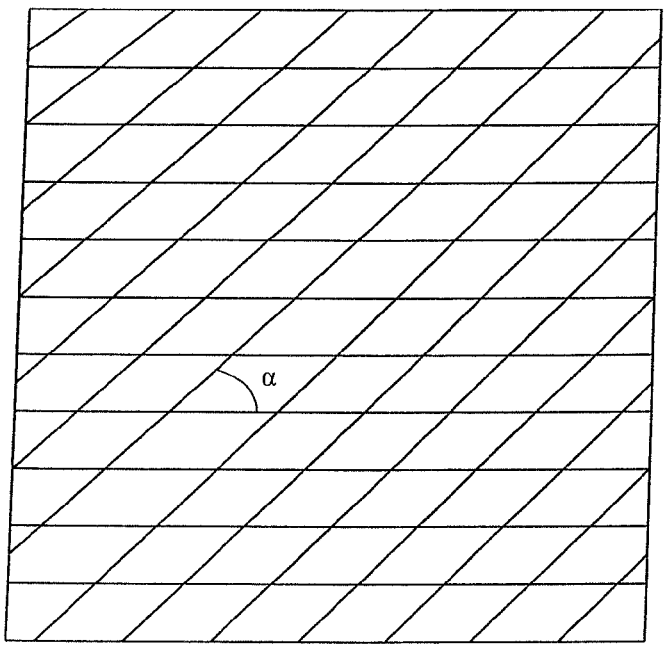
FIG. 3 is a sketch similar to FIG. 1, but with a different angle between the strips.

In the embodiment illustrated before the angle between the strips is 90°. However, also other angles are possible. For example FIG. 3 shows a sketch with an angle α of 45°. Substituting the vertical arrays of FIG. 1 with the inclined arrays of FIG. 3, the embodiments lead to similar patterns of the strips in the final composite materials, however with the difference that the strips are not at right angles, but at angles of 45° with each other. The choice of the angle may depend on the required characteristics of the final composite material.

Reference is made now to FIG. 4 which shows eight successive stages during the manufacture of a composite material. As will appear, this composite material comprises two layer assemblies with each two sets of strips.

Figure 4A:
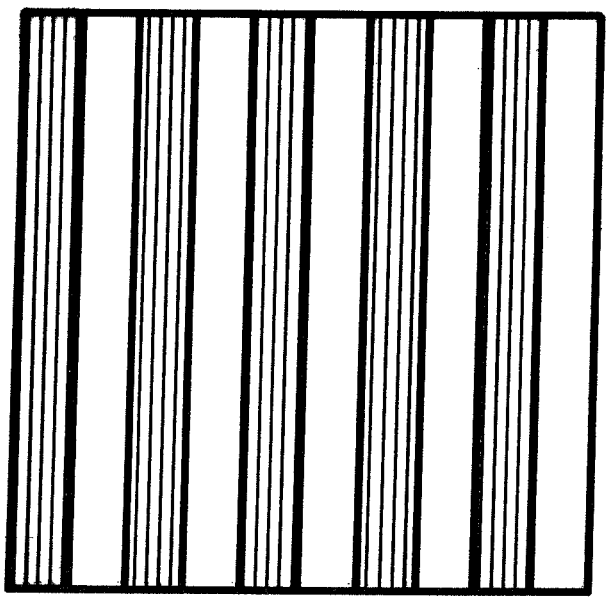
FIG. 4 shows eight successive stages during making an embodiment of a composite material according to the present invention.
Figure 4B:
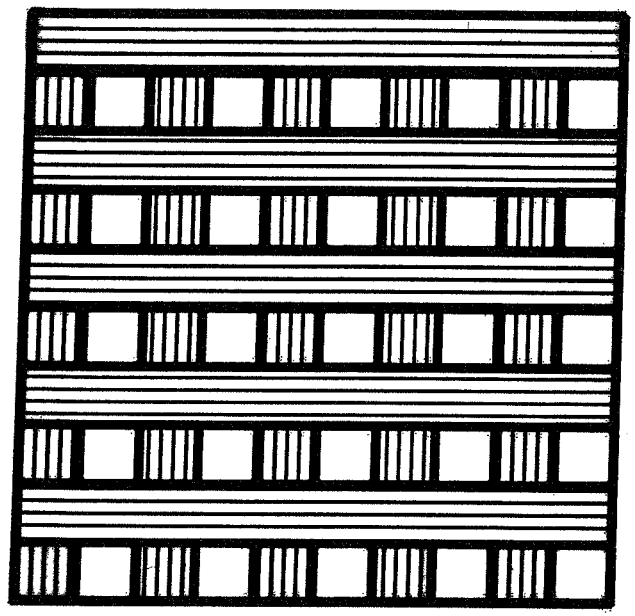
Figure 4C:
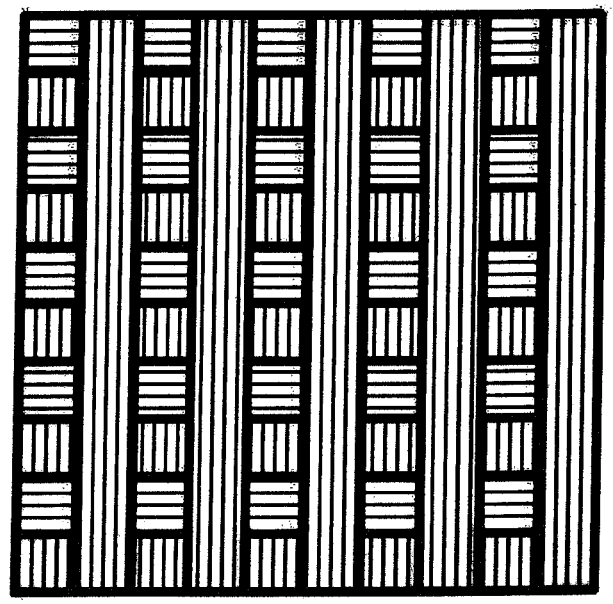
Figure 4D:
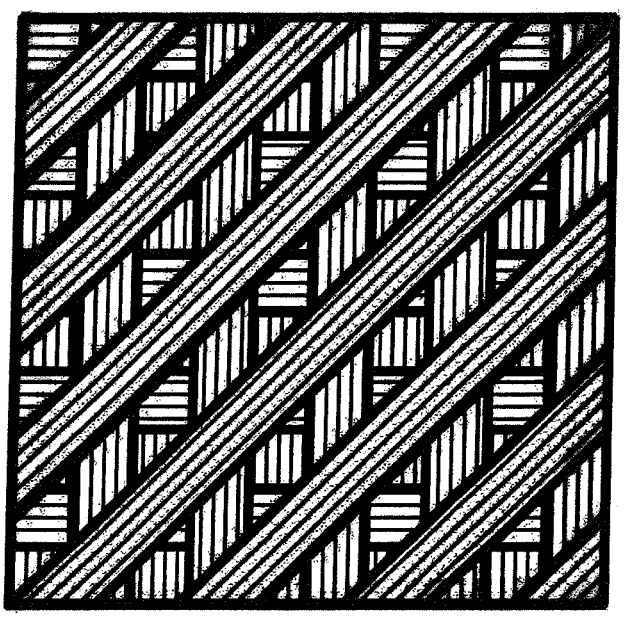

The first three steps as represented by FIGS. 4a-4c fully correspond with the steps represented, in FIGS. 2a-2c. However, before a step is carried out corresponding to FIG. 2d which would complete the first (lower) layer assembly (by depositing the final group of strips for completing the second set of parallel strips extending horizontally in the figures), FIG. 4d shows the deposition of a diagonally (45°) extending group of strips which define a first part of a first set of parallel strips of the second (upper) layer assembly. Only then the final group of strips for completing the second set of strips of the first layer assembly is deposited (FIG. 4e), after which the second layer assembly is completed in a manner corresponding with FIGS. 2b-2d (but under different angles of 45° and 135° in stead of 0° and 90°) as shown in FIGS. 4f-4h (wherein FIG. 4f shows the deposition of a group of strips as a first part of a second set of strips, FIG. 4g shows the deposition of a group of strips as a second part for completing the first set of parallel strips of the second layer assembly and FIG. 4h shows the deposition of a group of strips as a second part for completing the second set of parallel strips of the second layer assembly and thus for entirely completing the second layer assembly).

Figure 4E:
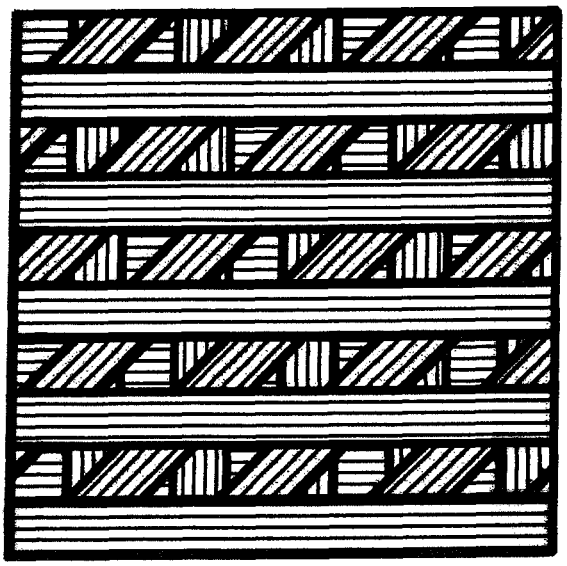
Figure 4F:
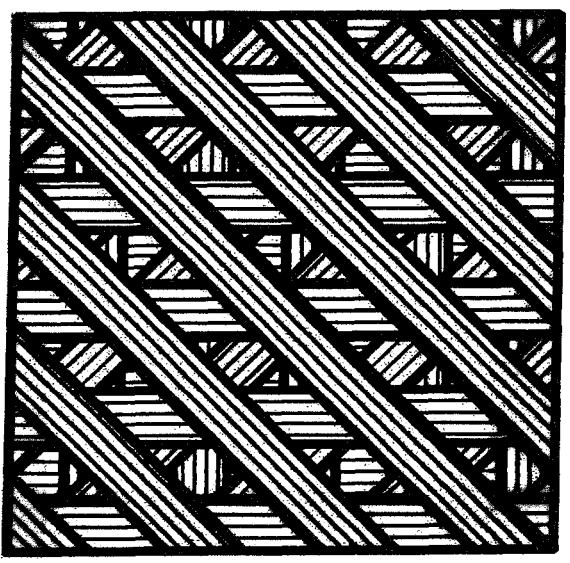
Figure 4G:
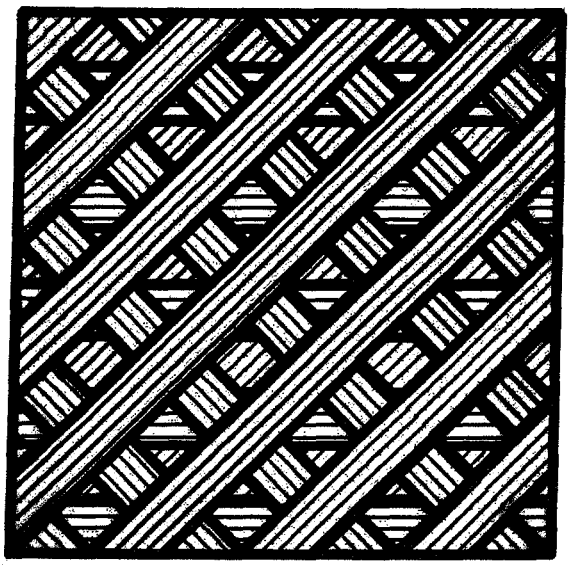
Figure 4H:
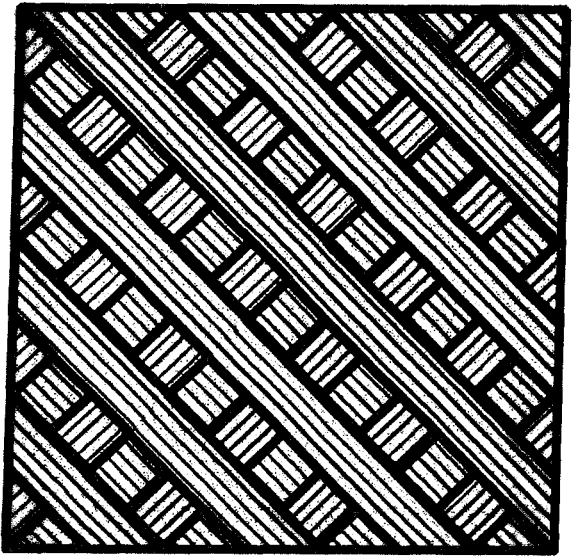

Thus it follows that firstly the first group of parallel strips of a following layer assembly is deposited (FIG. 4d) before the final group of parallel strips for completing a previous layer assembly is deposited (FIG. 4e). As a result a coherence between the adjacent layer assemblies may be obtained preventing delaminating effects.

It should be noted that the first group of parallel strips of a following layer assembly deposited in correspondence with FIG. 4d preferably should extend at an angle with the final group of parallel strips for completing a previous layer assembly as deposited during step 4e. In the present invention this angle is 45°, but other angles are conceivable too.

Although FIG. 4 shows a method for making a composite material with two layer assemblies, a corresponding method is conceivable for making a composite material with any desired number of layer assemblies. In the embodiment illustrated in FIG. 4 the addition of an extra layer assembly would incur the deposition of a first group of strips (as a first part of a first set of strips of the third layer assembly) after the step according to FIG. 4g, but before the step according to FIG. 4h (after which the third layer assembly would be completed in a manner as described before), Depending on the desired thickness of the final composite material this process may be repeated as many times as required.

But also the number of sets of strips in the layer assemblies may vary and does not necessarily have to be two. The number of sets (layers) of strips further may differ between different layer assemblies within the same composite material (such that different layer assemblies have a different number of sets (layers) of strips).

Depositing the strips may be carried out in an automated manner by appropriate machines. Such machines may be devised to carry out more than one process simultaneously and in parallel.

The resulting composite material has a pattern in which at each location a number of layers of strips are positioned one on top of the other, in such a manner that the majority of the strips at different places define different ones of the layers positioned one on top of the other. The strip arrangement, however, is obtained exclusively by depositing the strips successively one on top of the other in a well defined manner without interweaving strips.

The invention is not limited to the embodiments described before which may be varied in many ways within the scope of the invention as defined by the appending claims. For example it is possible that the strips extend not perfectly along straight lines but in a curved manner. Further the composite material according to the present invention may be combined with any other material, conventional or not, for yielding a combined composite material. For example, such a combined composite material may comprise conventional bands of material deposited in a conventional manner.

The invention claimed is:

1. Method for making a composite material from strips comprising longitudinal fibers and a binder or resin, which material comprises a number of layer assemblies one on top of the other, wherein each layer assembly comprises m sets, m being equal to or greater than 2, of parallel strips each extending in a different direction and wherein each layer assembly is manufactured by the successive steps of:

a. depositing, as part of a first set of strips, a first group of parallel strips side by side at a predetermined spacing;
b. depositing, as part of a second set of strips, on top of the first group of strips, a second group of parallel strips side by side at said predetermined spacing and each extending at an angle different from 180° with respect to the strips of the first group;
c. repeating step b. for all remaining sets of the m sets of strips, wherein the strips deposited as part of each next set of parallel strips are deposited at an angle different from 180° with respect to the strips of all the previous sets;
d. positioning, as a further part of the first set of strips, on top of the previously deposited groups of strips, a next group of parallel strips side by side at said predetermined spacing, in parallel to and immediately adjacent to the strips of the first group;
e. positioning, as a further part of the second set of strips, on top of the previously deposited groups of strips, a next group of parallel strips side by side at said predetermined spacing, in parallel to and immediately adjacent to the strips of the second group;
f. repeating step e. for all remaining sets of the m sets of strips;
g. repeating the steps d. to f. until a last group of parallel strips is deposited as part of the last set of strips such that all the predetermined spacings are completely occupied by adjacently positioned strips and a layer assembly is completed,
and wherein, before completing a layer assembly, with the exception of the last layer assembly, by depositing its last group of parallel strips during the respective step g, the first group of parallel strips of the following layer assembly is deposited in accordance with the respective step a.

2. Method according to claim 1, wherein the strips of the first group of parallel strips of the following layer assembly are deposited at an angle with respect to the strips of the last group of parallel strips of the previous layer assembly.

3. Method according to claim 1, wherein the strips of each group are deposited at a spacing substantially equal to an integer multiple n of the strip width and wherein step g. comprises repeating the steps d.to f. n−1 times.

4. Method according to claim 3, wherein the strips of each group are deposited at a spacing substantially equal to the strip width and wherein step g is omitted.

5. Method according to claim 1, wherein at least one layer assembly comprises only two sets (m=2) of parallel strips.

6. Method according to claim 1, wherein at least one layer assembly comprises four sets (m=4) of parallel strips.

7. Method according to claim 1, wherein all the layer assemblies basically comprise the same number and arrangement of sets of strips.

8. Composite material made from strips comprising longitudinal fibers and a binder or resin, which material comprises a number of layer assemblies one on top of the other, wherein each layer assembly comprises m sets, m being equal to or greater than 2, of parallel strips each extending in a different direction, with
a. a first group of parallel strips deposited side by side at a predetermined spacing;
b. on top of the first group of strips, a second group of parallel strips deposited side by side at said predetermined spacing and each extending at an angle different from 180° with respect to the strips of the first group;
c. a repetition of groups according to b. for all remaining sets of the m sets of strips, wherein the strips deposited as part of each next set of parallel strips are deposited at an angle different from 180° with respect to the strips of all the previous sets;
d. on top of the previously deposited groups of strips, a next group of parallel strips deposited side by side at said predetermined spacing, in parallel to and immediately adjacent to the strips of the first group;
e. on top of the previously deposited groups of strips, a next group of parallel strips deposited side by side at said predetermined spacing, in parallel to and immediately adjacent to the strips of the second group;
f. a repetition of groups according to e. for all remaining sets of the m sets of strips;
g. a repetition of groups according to d. to f. until a last group of parallel strips is deposited such that all the predetermined spacings are completely occupied by adjacently positioned strips,
and wherein the first group of parallel strips according to a. of a following layer assembly is deposited below the last group of parallel strips according to g of a previous layer assembly.

9. Composite material according to claim 8, wherein the strips of the first group of parallel strips of the following layer extend at an angle with respect to the strips of the last group of parallel strips of the previous layer assembly.

10. Composite material according to claim 8, wherein the strips of each group are deposited at a spacing substantially equal to an integer multiple n of the strip width.

11. Composite material according to claim 8, wherein the strips of each group are deposited at a spacing substantially equal to the strip width.

12. Composite material according to claim 8, wherein at least one layer assembly comprises only two sets (m=2) of parallel strips.

13. Composite material according to claim 8, wherein at least one layer assembly comprises four sets (m=4) of parallel strips.

14. Composite material according to claim 8, wherein all the layer assemblies comprise the same number and arrangement of sets of strips.

15. End product comprising composite material made from strips comprising longitudinal fibers and a binder or resin, which material comprises a number of layer assemblies one on top of the other,
wherein each layer assembly comprises m sets, m being equal to or greater than 2, of parallel strips each extending in a different direction, with
a. a first group of parallel strips deposited side by side at a predetermined spacing;
b. on top of the first group of strips, a second group of parallel strips deposited side by side at said predetermined spacing and each extending at an angle different from 180° with respect to the strips of the first group;
c. a repetition of groups according to b. for all remaining sets of the m sets of strips, wherein the strips deposited as part of each next set of parallel strips are deposited at an angle different from 180° with respect to the strips of all the previous sets;
d. on top of the previously deposited groups of strips, a next group of parallel strips deposited side by side at said predetermined spacing, in parallel to and immediately adjacent to the strips of the first group;
e. on top of the previously deposited groups of strips, a next group of parallel strips deposited side by side at said predetermined spacing, in parallel to and immediately adjacent to the strips of the second group;

f. a repetition of groups according to e. for all remaining sets of the m sets of strips;

g. a repetition of groups according to d. to f. until a last group of parallel strips is deposited such that all the predetermined spacings are completely occupied by adjacently positioned strips, and wherein the first group of parallel strips according to a. of a following layer assembly is deposited below the last group of parallel strips according to g of a previous layer assembly.

16. Method according to claim 5, wherein the only two sets of parallel strips extend orthogonally to each other.

17. Method according to claim 6, wherein the four sets of parallel strips extend at 45°, 90° and −45° with respect to each other.

18. Composite material according to claim 12, wherein the only two sets of parallel strips extend orthogonally to each other.

19. Composite material according to claim 13, wherein the four sets of parallel strips extend at 45°, 90° and −45° with respect to each other.

20. End product according to claim 15, wherein at least one layer assembly comprises only two sets (m=2) of parallel strips extending orthogonally to each other or four sets (m=4) of parallel strips extending at 45°, 90° and −45° with respect to each other.

* * * * *